(12) United States Patent
Hanada et al.

(10) Patent No.: US 9,302,789 B2
(45) Date of Patent: Apr. 5, 2016

(54) METHOD FOR CLEARING SPACE DEBRIS

(75) Inventors: Toshiya Hanada, Fukuoka (JP);
Yukihito Kitazawa, Tokyo (JP);
Aritsune Kawabe, Tokyo (JP)

(73) Assignees: IHI Corporation, Tokyo (JP);
KYUSHU UNIVERSITY, Fukuoka-shi (JP)

( * ) Notice: Subject to any disclaimer, the term of this patent is extended or adjusted under 35 U.S.C. 154(b) by 569 days.

(21) Appl. No.: 13/513,342

(22) PCT Filed: Dec. 3, 2010

(86) PCT No.: PCT/JP2010/071662
§ 371 (c)(1),
(2), (4) Date: Aug. 1, 2012

(87) PCT Pub. No.: WO2011/068193
PCT Pub. Date: Jun. 9, 2011

(65) Prior Publication Data
US 2012/0286097 A1    Nov. 15, 2012

(30) Foreign Application Priority Data

Dec. 4, 2009   (JP) .................................. 2009-276530

(51) Int. Cl.
| | | |
|---|---|---|
| *B64G 1/00* | (2006.01) | |
| *B64G 1/10* | (2006.01) | |
| *B64G 1/24* | (2006.01) | |
| *B64G 1/64* | (2006.01) | |
| *B64G 1/66* | (2006.01) | |
| *B64G 1/56* | (2006.01) | |

(52) U.S. Cl.
CPC .............. *B64G 1/1078* (2013.01); *B64G 1/242* (2013.01); *B64G 1/646* (2013.01); *B64G 1/66* (2013.01); *B64G 1/56* (2013.01)

(58) Field of Classification Search
CPC .......... B64G 1/56; B64G 1/66; B64G 1/1078; B64G 1/646
USPC .................................. 244/158.1, 158.6, 171.7
See application file for complete search history.

(56) References Cited

U.S. PATENT DOCUMENTS

| | | | | |
|---|---|---|---|---|
| 4,936,528 A | * | 6/1990 | Butner et al. .............. | 244/171.7 |
| 7,309,049 B2 | | 12/2007 | Bigelow | |
| 2012/0068018 A1 | * | 3/2012 | Wright ....................... | 244/171.7 |

FOREIGN PATENT DOCUMENTS

| | | |
|---|---|---|
| JP | 4-90499 U | 8/1992 |
| JP | 5-286500 A | 11/1993 |
| JP | 6-206599 | 7/1994 |
| JP | 11-236000 A | 8/1999 |

(Continued)

OTHER PUBLICATIONS

Irene Klotz, "Agency looks for ideas to clean up space junk" Sep. 25, 2009, NBCNews.com.*

(Continued)

*Primary Examiner* — Nicholas McFall
(74) *Attorney, Agent, or Firm* — Oblon, McClelland, Maier & Neustadt, L.L.P.

(57) ABSTRACT

Disclosed is a method for clearing space debris in geocentric orbit, wherein, in geocentric orbit, a spatial region having a greater resistive force than atmosphere in the geocentric orbit is provided, space debris passing through the spatial region is decelerated by the resistive force, and the decelerated space debris is dropped from the geocentric orbit.

3 Claims, 5 Drawing Sheets

(56) References Cited

FOREIGN PATENT DOCUMENTS

| | | | |
|---|---|---|---|
| JP | 2002-2599 A | 1/2002 | |
| JP | 2004-98959 A | 4/2004 | |
| JP | 2007-109514 A | 4/2007 | |
| RU | 2 092 409 C1 | 10/1997 | |
| WO | WO 2009/091037 A1 | 7/2009 | |

OTHER PUBLICATIONS

Daniel Michaels, "A Cosmic Question: How to Get Rid of All That Orbiting Space Junk?" Mar. 11, 2009, Wall Street Journal, p. 1.*

Office Action issued Sep. 26, 2013, in Russian Patent Application No. 2012127365/11(042560) with English translation.

Great Soviet Encyclopedia, vol. 2, Moscow, "Soviet Encyclopedia" Publishing House, 1970, 1 front page, p. 125 with English translation.

"Space Science Reference Book", Moscow, Military Publishing House of the Department of Defense, 1966, 1 front page, p. 125 with English translation.

International Search Report issued Dec. 28, 2010 in PCT/JP2010/071662.

J.-C. Liou, et al., "Planetary Science: Risks in Space from Orbiting Debris", Science, vol. 311, Issue 5459, Jan. 20, 2006, pp. 340-341.

David A. Vallado, "Fundamentals of Astrodynamics and Applications, Second Edition", Space Technology Library, 2001, pp. 532-534 plus cover pages.

Japanese Office Action issued Sep. 3, 2013 in Patent Application No. 2009-276530 with English Translation.

Japanese Office Action issued on Jan. 27, 2015 in Patent Application No. 2009-276530, with English translation.

* cited by examiner

METHOD FOR CLEARING SPACE DEBRIS

TECHNICAL FIELD

The present invention relates to a method for clearing space debris in a geocentric orbit.

BACKGROUND ART

Space debris is man-made objects that are orbiting in geocentric orbits without being used. Examples of space debris include: spacecrafts (artificial satellites, space stations, space shuttles, and the like) which terminated operations due to end of lives, accidents and failures; bodies and components of rockets used to launch artificial satellites; fragments generated in stage separation of multistage rockets; tools dropped by astronauts during extravehicular activities; and the like. Moreover, the space debris also includes minute debris generated by space debris colliding with each other and being crushed into pieces. Accordingly, there are various sizes of space debris.

The above-described space debris may collide with a currently operating spacecraft in a geocentric orbit intersecting the geocentric orbits of the space debris and may hinder operation of the spacecraft. Existence of large space debris (including intact spacecrafts) having diameters in excess of 10 cm can be detected from the ground in advance by using radars and the like, and the spacecraft can be caused to take measures for evasive actions (orbit change, posture change, crew evacuation, and the like). However, since small space debris having diameters equal to or below 10 cm is difficult to detect from the ground, it is practically impossible to cause the spacecrafts to take evasive actions.

Accordingly, as a countermeasure for the space debris, there is proposed a technique in which: a thin metallic plate is located in front of a spacecraft in a traveling direction; space debris flying toward the spacecraft is made to hit and penetrate this metallic plate; and thus the space debris is crushed into small pieces. In this technique, the space debris after the crush, which have an increased area-to-mass ratio (average cross-sectional area/mass) as compared to that of the space debris before the crush, is dropped from the geocentric orbit by means of air drag (atmospheric drag) (see Patent Document 1).

PRIOR ART DOCUMENT

Patent Document

Patent Document 1: Japanese Patent Application Publication No. 2002-2599

SUMMARY OF INVENTION

Technical Problem

However, the orbiting velocity of the crushed space debris in the geocentric orbit may become faster than the orbiting velocity of the space debris before the crush. If the orbiting velocity of the crushed space debris becomes faster, the dropping of the space debris by means of the air drag accordingly becomes more difficult. Therefore, the crush of the space debris according to the above-described related art may lead to an unintended increase in the space debris due to a failure to drop the space debris with the increased orbiting velocity.

The present invention has been made in view of the aforementioned circumstances. An object of the present invention is to provide a method for clearing space debris which is capable of clearing space debris in the geocentric orbit without crushing.

Solution to Problem

An aspect of the present invention is a method for clearing space debris in a geocentric orbit, including: locating a spatial region in the geocentric orbit, the spatial region having a greater resistive force than a resistive force of atmosphere in the geocentric orbit; decelerating space debris passing through the spatial region by the resistive force of the spatial region; and dropping the decelerated space debris from the geocentric orbit.

DESCRIPTION OF EMBODIMENTS

Embodiments of the present invention will be described below with reference to the drawings.

Figure 1:
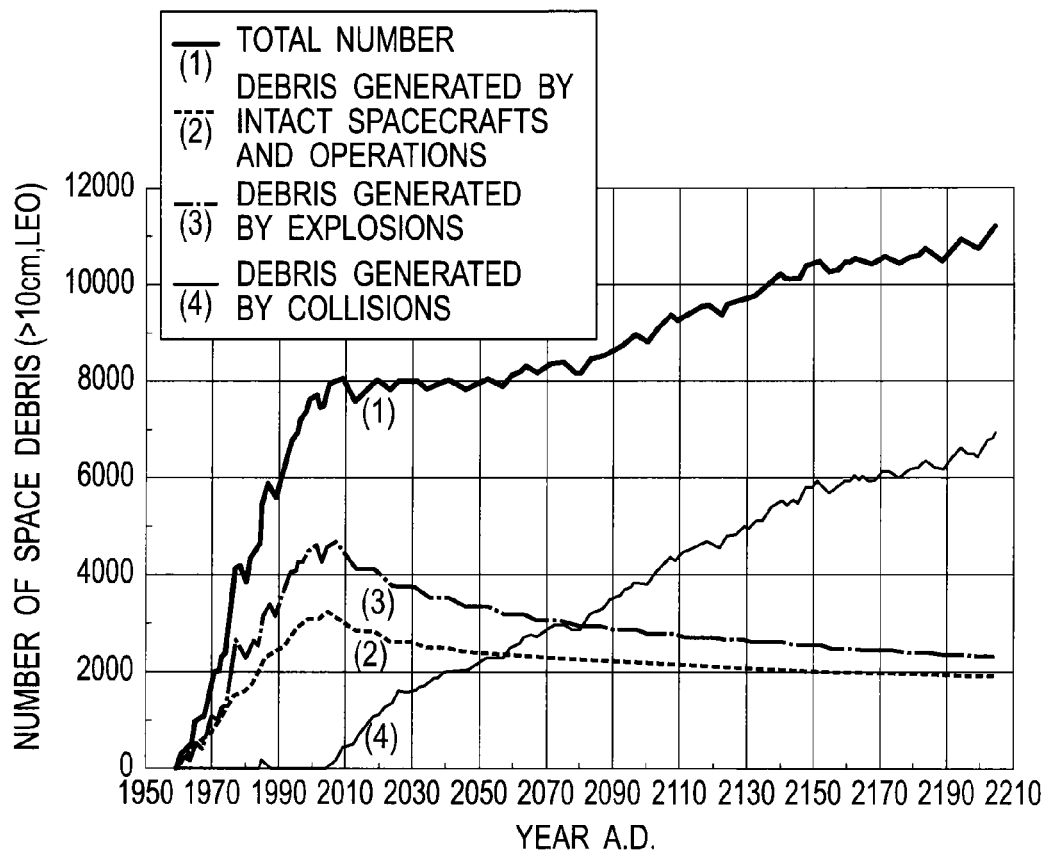
FIG. 1 is a graph showing the present situation and future forecast of space debris.

First, the present situation and future forecast of space debris will be explained prior to the specific description of embodiments of the present invention. FIG. 1 is a graph showing transition in the number of space debris over a period starting from the launch of Sputnik 1 in 1957 to the future (Source: Liou, J.-C., Johnson N. L., PLANETARY SCIENCE: Risks in Space from Orbiting Debris, Science Vol. 311, Issue 5759, 2006, pp. 340-341.). The vertical axis in this graph indicates the number of space debris (large space debris having diameters greater than 10 cm which can be acquired from the ground using radars and the like) and the horizontal axis therein indicates the year A.D. Figures on and before Jan. 1, 2006 are actual measurement values while figures thereafter are estimate values. It is to be noted, however, that these estimate values are values calculated on the assumption that no spacecrafts (including artificial satellites, space stations, space shuttles, and the like) will be launched and no explosions of spacecrafts (artificial explosions using missiles and the like or explosions caused due to the spacecrafts per se) will occur in and after 2006. Meanwhile, in FIG. 1, a thin line indicates debris generated by collisions, a broken line indicates debris generated by intact spacecrafts and operations thereof (dropped tools and the like), a chain line indicates debris generated by explosions of spacecrafts, and a thick line indicates a total of those pieces of debris, respectively.

According to a research result shown on the graph in FIG. 1, the number of space debris generated by collisions balances the number of space debris that fall and disappear due to atmospheric drag whereby the total number of space debris maintains a state of equilibrium until 2055. Thereafter, the total number of the space debris tends to increase naturally because the number of space debris generated by collisions will exceed the number of space debris falling and disappearing due to the atmospheric drag. As a consequence, the space debris is likely to increase without launching any spacecrafts in the future. That is, the space environment is in a precarious state already while spacecrafts are in fact being launched at the present time, and therefore the space debris actually seems to be increasing at the very moment.

Based on the above-described circumstances, it is obvious that clearing the space debris from the geocentric orbit is very important in clearing up the space environment and stabilizing operations of spacecrafts.

Next, embodiments of a method for clearing space debris according to the present invention will be specifically described below.

Figure 2:
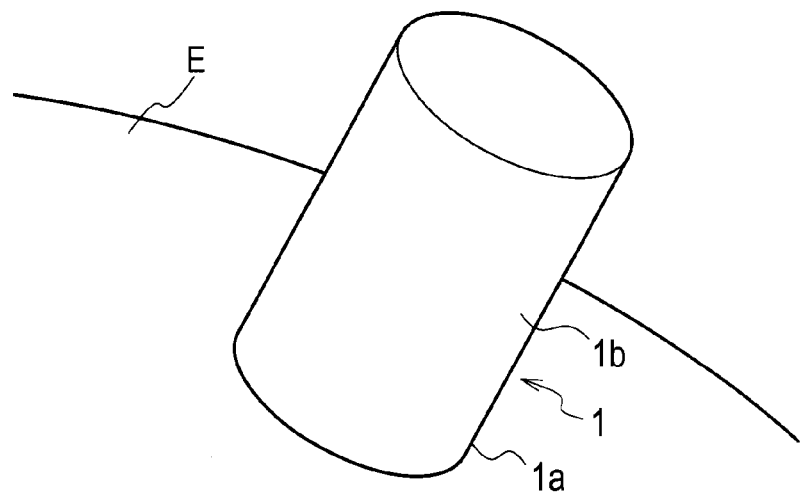
FIG. 2 is a conceptual diagram showing a first embodiment of a method for clearing space debris according to the present invention.

FIG. 2 is a conceptual diagram showing a first embodiment of a method for clearing space debris according to the present invention. In this embodiment, a hollow cylindrical body (a tubular body) 1 is located in the geocentric orbit where space debris (not shown) to be cleared are orbiting.

The cylindrical body 1 includes a frame 1a, and a deceleration material 1b (a spatial region) stretched on this frame 1a to form a peripheral surface of the cylindrical body 1. The deceleration material 1b has higher density (mass per unit area) than that of the atmosphere at the altitude of the geocentric orbit where the cylindrical body 1 is located. For this reason, the deceleration material 1b can apply a greater frictional force than that of the atmosphere at the altitude to the space debris when the space debris passes therethrough. A relatively low-density material is used for this deceleration material 1b. This low-density material has given density and strength for allowing the space debris to be cleared, upon incidence at assumed incident velocity, to enter the inside almost without causing destruction. For example, a foam material (e.g. a polyimide foam material), aerogel (e.g. silica aerogel), a foil stack or the like can be used as the low-density material. The foil stack is formed of metallic or plastic foils stacked in multiple layers. Note that the peripheral surface of the cylindrical body 1 may be constructed with an integrally formed deceleration material 1b or may be constructed by arranging multiple deceleration materials 1b, which are segmented either in the circumferential direction or the axial direction of the cylindrical body 1, along the peripheral surface of the cylindrical body 1. In addition, the frame 1a is not particularly limited as long as the frame 1a is configured to stretch the deceleration material 1b as the peripheral surface of the cylindrical body 1. For example, the frame 1a may be constructed with truss members that are fixed to an inner peripheral surface of the integrally formed deceleration material 1b, or may be constructed with frame members that surround the respective segmented deceleration materials 1b and with beam members configured to join the respective frame members.

The cylindrical body 1 having the above-described configuration is formed by setting the dimension in the direction of the central axis greater than the diameter. The cylindrical body 1 having this shape is located in the geocentric orbit in such a posture that one of open ends is directed to the Earth E by the action of gravity gradient. As a consequence, space debris orbiting in the geocentric orbit, which is located at the same altitude as the geocentric orbit for the cylindrical body 1 but is different from the geocentric orbit for the cylindrical body 1, pass through the cylindrical body 1 in a radial direction (or in a direction parallel to the radial direction) thereof at a point where the geocentric orbit for itself crosses the geocentric orbit for the cylindrical body 1. That is, the space debris passes through the cylindrical body 1 in a direction intersecting a straight line that connect both open ends of the cylindrical body 1 to each other, and pass the deceleration material 1b in two positions on the peripheral surface of the cylindrical body 1 provided with an interval in the circumferential direction at this time.

The deceleration material 1b of the cylindrical body 1 is formed into a given thickness so that, upon entry of a single piece of space debris, the deceleration material 1b allows the single piece of space debris to pass therethrough almost without causing destruction and can decelerate flight velocity of the single piece of space debris by applying a frictional force to the single piece of space debris at the time of the passage. Such an appropriate thickness of the deceleration material 1b can be determined by conducting the following study, for example.

Figure 3:
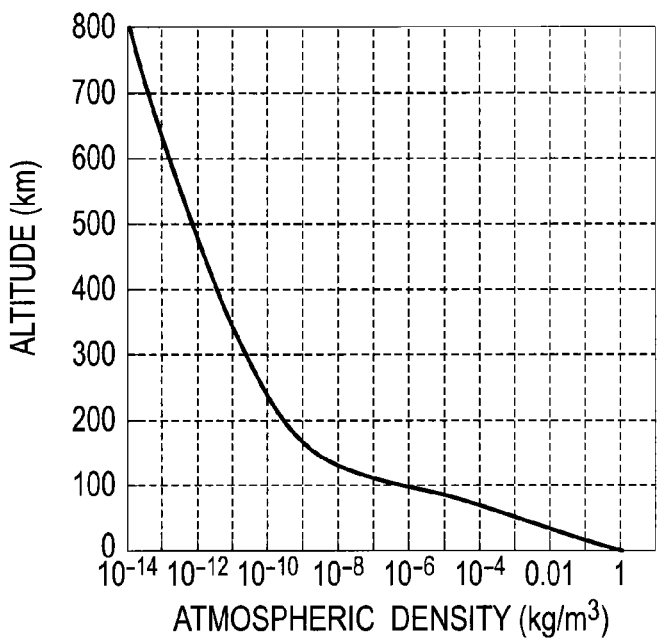
FIG. 3 is a graph showing an exponential function model which represents an example of an atmospheric density model with respect to the altitude.

First, the diameter and the mass (density, an area-to-mass ratio) of space debris to be cleared are determined. Here, the space debris is assumed to be a ball having a diameter of 1 cm and made of an aluminum alloy having density equal to 2.77 g/cm$^3$. In addition, this aluminum alloy ball is assumed to be orbiting on a circular orbit within a two-dimensional plane and the atmospheric drag is assumed to be the only perturbative force acting on the aluminum alloy ball during orbiting. Here, the atmospheric density in the geocentric orbit where the cylindrical body 1 is located will be determined based on an exponential function model in FIG. 3 (Source: David A. Vallado, "Fundamentals of Astrodynamics and Applications, 2nd Edition," pp. 532-534.), which represents an example of an atmospheric density model with respect to the altitude. Moreover, aerogel having density equal to 1.9 kg/m$^3$ is assumed to be used for the deceleration material 1b. The friction resistance (the frictional force) to be received by the aluminum alloy ball during passage through the aerogel is assumed to be the same as the air resistance received by the aluminum alloy ball when the ball passes through the air having the same density as that of the aerogel.

Figure 4:
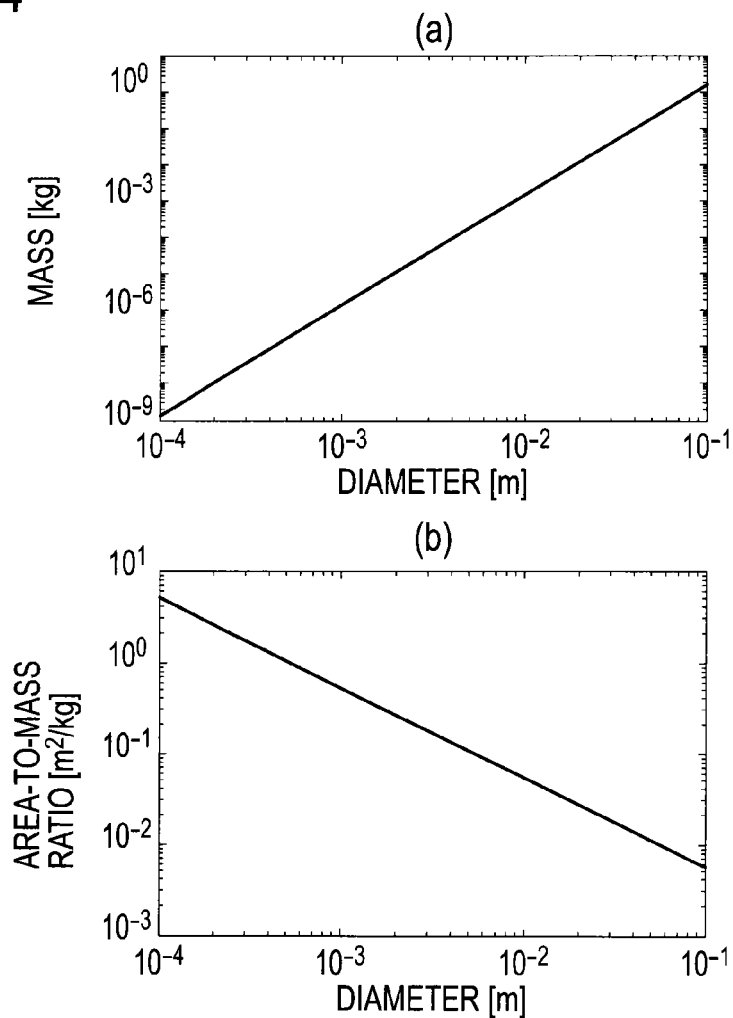
FIG. 4 is a graph showing a correlation between a mass and a diameter as well as a correlation between an area-to-mass ratio and the diameter of an aluminum alloy ball. Part (a) of FIG. 4 is a graph showing a correlation between a mass and a diameter of an aluminum alloy ball having density of 2.77 $g/cm^3$; and part (b) of FIG. 4 is a graph showing a correlation between an area-to-mass ratio and the diameter of the aluminum alloy ball.

A relation between the diameter and the mass of the aluminum alloy ball having the above-mentioned density has a correlation shown on a graph in FIG. 4(a). According to this graph, the mass of the aluminum alloy ball having the diameter of 1 cm is equal to 1.45 g, for example. In the meantime, an area-to-mass ratio of the aluminum alloy ball having the diameter of 1 cm and the mass of 1.45 g has a correlation shown on a graph in FIG. 4(b) with the diameter. According to this graph, the area-to-mass ratio which is a parameter necessary for orbit calculation in terms of the aluminum alloy ball having the diameter of 1 cm is equal to 0.054 m²/kg.

Figure 5:
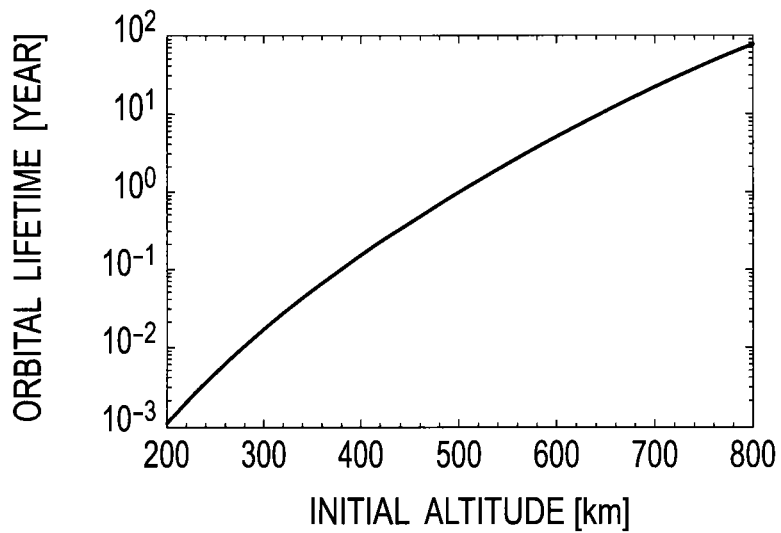
FIG. 5 is a graph showing orbital lifetime of the aluminum alloy ball having a diameter of 1 cm.

FIG. 5 is a graph showing orbital lifetime of the aluminum alloy ball having the diameter of 1 cm. The orbital lifetime cited herein is the time required for the aluminum alloy ball having the diameter of 1 cm to fall from the geocentric orbit and to disappear, which is expressed in the number of years. In the study of the thickness of the deceleration material 1b, the aluminum alloy ball having the diameter of 1 cm is assumed to orbit in the geocentric orbit at the altitude of 800 km where it takes about 100 years for the ball to fall from the geocentric orbit and disappear, thereby being naturally cleared up.

Figure 6:
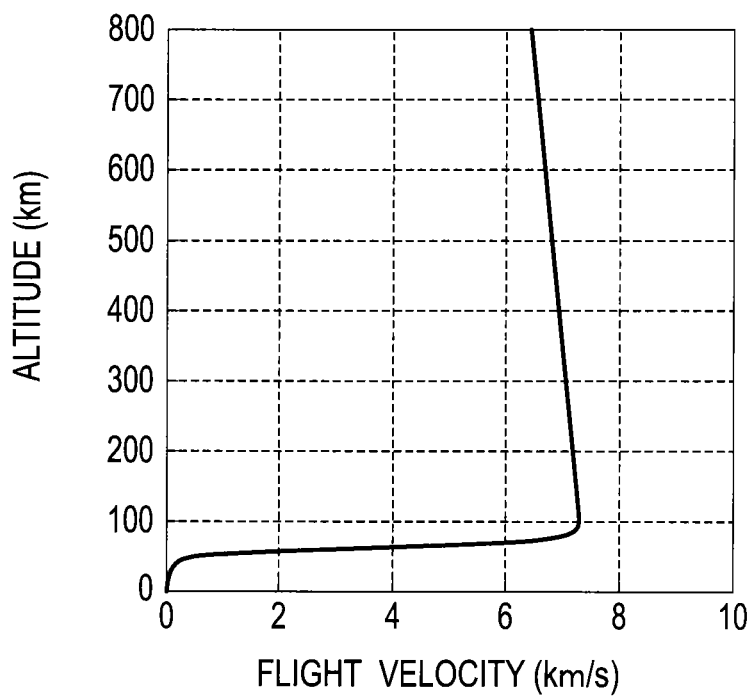
FIG. 6 is a graph showing flight velocity of space debris with respect to the altitude.

FIG. 6 is a graph showing flight velocity of space debris with respect to the altitude. As shown in FIG. 6, the space debris suddenly loses the flight velocity at the altitude below 100 km and falls into the atmosphere. The space debris falling into the atmosphere burns out and disappears. Hence the space debris can be deemed to have fallen and disappeared when the altitude decreases to 90 km.

Figure 7:
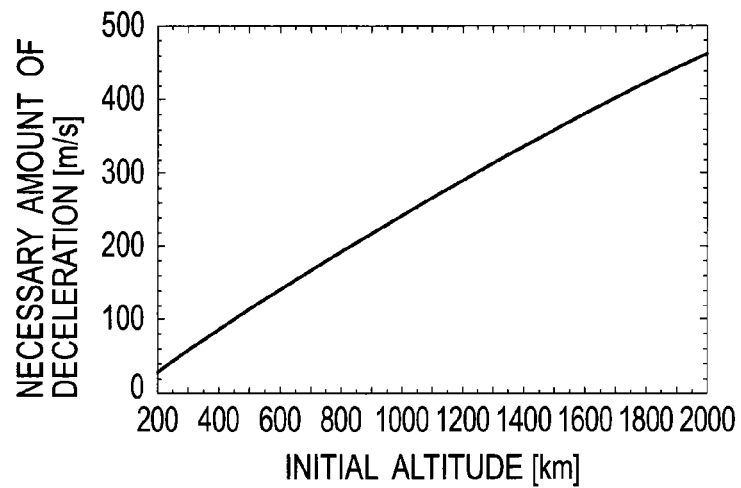
FIG. 7 is a graph showing a correlation between an amount of deceleration of the aluminum alloy ball, which is necessary for decreasing perigee altitude in the geocentric orbit where the aluminum alloy ball having the diameter of 1 cm is orbiting, down to 90 km, and initial altitude of the geocentric orbit.

Now, consideration is made regarding an amount of deceleration of the aluminum alloy ball necessary for decreasing perigee altitude in the geocentric orbit where the aluminum alloy ball having the diameter of 1 cm is orbiting, down to 90 km. FIG. 7 is a graph showing a correlation between the necessary amount of deceleration and initial altitude of the geocentric orbit. As shown in FIG. 7, assuming that the initial altitude of the geocentric orbit of the aluminum alloy ball is equal to 800 km, the amount of deceleration of the aluminum alloy ball necessary for decreasing the perigee altitude in the geocentric orbit down to 90 km is equal to about 200 m/s.

Figure 8:
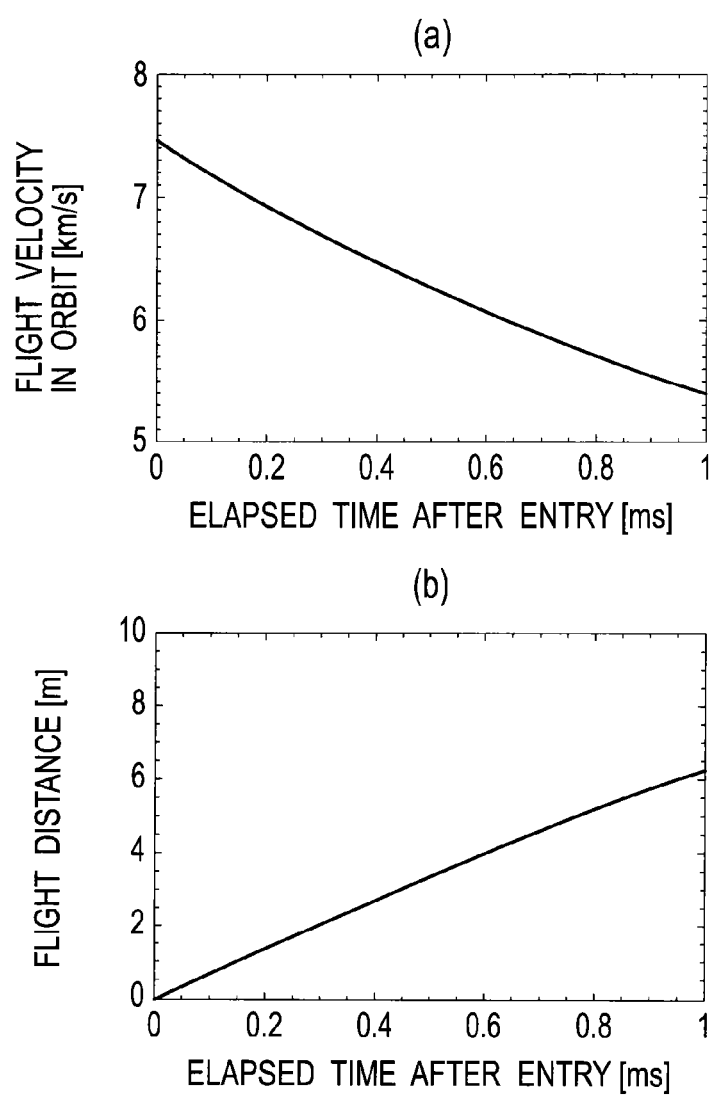
FIG. 8 is a graph showing velocity history and a flight (travel) distance of the aluminum alloy ball which enters aerogel. Part (a) of FIG. 8 is a graph showing velocity history of the aluminum alloy ball having the diameter of 1 cm and entering the aerogel over a period of 1 ms starting from a point of entry; and part (b) of FIG. 8 is a graph showing a flight (travel) distance of the aluminum alloy ball over the period of 1 ms after the entry to the aerogel.

FIG. 8(a) is a graph showing velocity history of the aluminum alloy ball having the diameter of 1 cm and entering the aerogel over a period of 1 ms starting from a point of entry; and FIG. 8(b) is a graph showing a flight (travel) distance of the aluminum alloy ball over the period of 1 ms after the entry to the aerogel. As shown in FIG. 8(a), time required for the aluminum alloy ball having the diameter of 1 cm to be decelerated by 200 m/s from the entry to the aerogel is around 0.1 ms. Meanwhile, as shown in FIG. 8(b), the distance the aluminum alloy ball having the diameter of 1 cm flies (travels) for 0.1 ms after the entry to the aerogel is less than 1 m.

Accordingly, when the aluminum alloy ball having the diameter of 1 cm and orbiting at the altitude of 800 km passes through the aerogel having the thickness of 1 m, the ball is decelerated to the velocity necessary for decreasing the perigee altitude in the geocentric orbit down to 90 km by means of the frictional force received from the aerogel at the time of the passage.

Here, the thickness of the deceleration material 1b may be set by determining the diameter and the mass (the density, the area-to-mass ratio) of the space debris to be cleared as well as the altitude of the geocentric orbit, and finding the amount of deceleration necessary for decreasing the perigee altitude in the geocentric orbit for the space debris down to 90 km. Thus, the deceleration material 1b may be set to have a thickness that can decelerate the space debris passing through the deceleration material 1b by the above-mentioned amount of deceleration, as described above. Here, in this embodiment, the space debris passes through the cylindrical body 1 in the radial direction thereof. Thus the space debris passes through the deceleration material 1b in two positions. Accordingly, this point (the point that the space debris passes through the deceleration material 1b twice) needs to be taken into account to determine the thickness of the deceleration material 1b.

Meanwhile, in order to prevent the increase of the space debris, rulemaking for clearing spacecrafts sent in the geocentric orbit from the geocentric orbit (by dropping it down to the ground, for example) after a predetermined period (25 years, for example) has been under consideration in recent years. Accordingly, the present invention may also be embodied by appropriately selecting the area-to-mass ratio of the cylindrical body 1 to be located in the geocentric orbit and locating the cylindrical body 1 in the geocentric orbit while configuring the cylindrical body 1 to fall down to the perigee altitude at 90 km after a predetermined period. Thus, by using the cylindrical body 1 orbiting around the Earth while gradually decreasing the perigee altitude over a predetermined period, it is possible to sequentially clear the space debris in the geocentric orbit at the altitude equal to or below the initial location of the cylindrical body 1 and to clear the cylindrical body 1 itself from the geocentric orbit as well.

A description has been given above of the embodiment, in the case of clearing space debris from the geocentric orbit, in which the cylindrical body 1 is located in the geocentric orbit at the altitude where the space debris to be cleared is orbiting while using the deceleration material 1b made of the low-density material (the foam material, the aerogel, the foil stack or the like) having the higher density than that of the atmosphere at the aforementioned altitude; and the frictional force is applied to the space debris at the time of passage through the low-density material (a period from the space debris' entry to and exit from the deceleration material 1b) so as to decelerate the space debris. This embodiment is an example of a method for clearing space debris of the present invention capable of clearing space debris from the geocentric orbit in which a spatial region is provided in the geocentric orbit at altitude where the space debris to be cleared is orbiting in such a manner that the spatial region has a greater resistive force than that of the atmosphere at the altitude; and the space debris is decelerated by the resistive force in the spatial region when the space debris passes through the spatial region (a period from the space debris' entry to and exit from the spatial region). Here, the "spatial region" means a three-dimensional finite region, and the "resistive force" means a force (a braking force) that acts on an object in the geocentric orbit when the object passes through the spatial region in such a way as to reduce a velocity component in the direction of the geocentric orbit. Accordingly, the spatial region having the great resistive force means the spatial region which can apply a greater braking force to the object that passes through the region.

Therefore, the resistive force for decelerating the space debris that passes through the spatial region is not limited only to the frictional force. For example, an electromagnetic force from a strong magnetic field may possibly be used as the resistive force for decelerating the space debris that passes through the spatial region. Specifically, space debris may be cleared from the geocentric orbit as follows: a spatial region is provided in the geocentric orbit at altitude where the space debris to be cleared is orbiting in such a manner that the spatial region has a stronger magnetic field than the magnetic field of the atmosphere at the altitude; and the space debris is decelerated by the electromagnetic force that acts on the space debris at the time of passage through the spatial region having the strong magnetic field.

Figure 9:
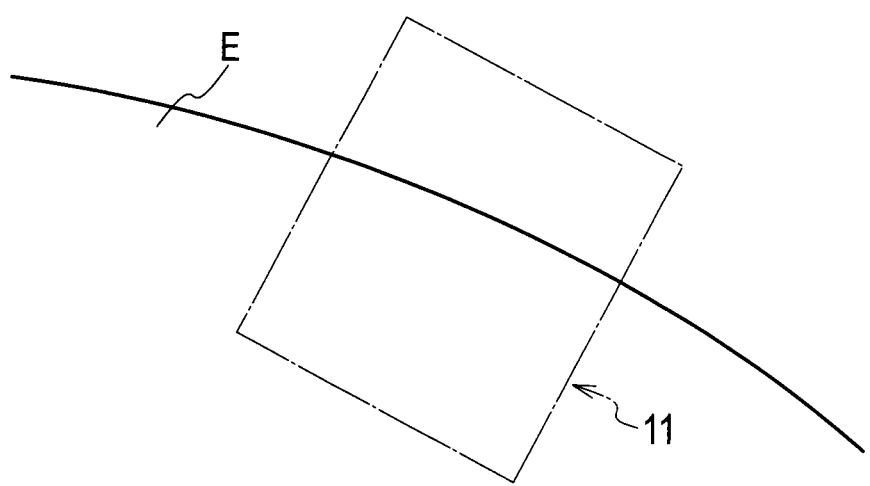
FIG. 9 is a conceptual diagram showing a second embodiment of the method for clearing space debris according to the present invention.

FIG. 9 is a conceptual diagram showing a second embodiment of the method for clearing space debris according to the present invention. In this embodiment, a spatial region 11 is provided in the geocentric orbit at altitude where the space debris to be cleared is orbiting in such a manner that the spatial region 11 has a stronger magnetic field than that of the atmosphere at the altitude where the geocentric orbit is present. The magnetic field in this spatial region 11 can be realized by feeding an electric current having appropriate magnitude and direction for forming a desired strong magnetic field in an object which is orbiting in different geocentric orbit at the same altitude as the geocentric orbit for the space debris to be cleared. In the strong magnetic field in this spatial region 11, a vector of the magnetic field preferably includes a vector component which is orthogonal to the geocentric orbit for the space debris.

In this embodiment, the space debris orbiting in the geocentric orbit which is located at the same altitude as the geocentric orbit for the spatial region 11 but different from the geocentric orbit for the spatial region 11 passes through the spatial region 11 at a point where the geocentric orbit for its own intersects the geocentric orbit for the spatial region 11. Then, charged particles in the space debris are subjected to a Lorentz force from the magnetic field in the spatial direction 11 in a different direction (ideally a direction toward Earth) from the direction of the geocentric orbit, or conducting bodies in the space debris are subjected to a force attributed to an interaction of the magnetic field and an induced current generated by electromagnetic induction. Thus the flight velocity of the space debris on the geocentric orbit is decelerated (with a change in the flight direction as the case may be).

Accordingly, the diameter and the mass (the density, the area-to-mass ratio) of the space debris to be cleared by the clearing method of this embodiment are determined, then the appropriate electromagnetic force for decelerating the space debris to the velocity necessary for decreasing the perigee altitude in the geocentric orbit down to 90 km may be found in response thereto, and the strength of the magnetic field in the spatial region 11 and the magnitude and the direction of the electric current necessary for creating the magnetic field may be determined in such a manner that the electromagnetic force acts on the space debris passing through the spatial region 11.

According to the above-described methods for clearing space debris of the first and second embodiments of the present invention, the flight velocity of the space debris in the geocentric orbit is decelerated by means of the frictional force and the electromagnetic force until the perigee altitude decreases to 90 km. Thus the space debris can be cleared from the geocentric orbit without causing the crush of the space debris which may lead to an increase in the orbiting velocity or a failure to drop the space debris.

In addition, according to the method for clearing space debris of the first embodiment of the present invention, the cylindrical body 1 configured to stretch the deceleration material 1b in a cylindrical shape on the frame 1a is used. Thus it is possible to cause the space debris to pass through the deceleration material 1b twice at the time of the passage through the cylindrical body 1 and thereby to execute deceleration of the space debris efficiently by means of the frictional force received from the deceleration material 1b.

Although the cylindrical body 1 is used in the above-described first embodiment, it is also possible to use a tubular body having a (regular) polygonal cross section instead of the cylindrical body. Meanwhile, when the space debris is decelerated by the frictional force at the time of passage through the deceleration material 1b, the deceleration material 1b does not always have to be a hollow body (the cylindrical body as in the first embodiment or the tubular body having the (regular) polygonal cross section). That is, the deceleration material 1b may be a solid body having a columnar shape or a prism shape applying a (regular) polygon.

In addition, the method for clearing space debris of the present invention is particularly useful when a clearing target is space debris equal to or below 10 cm which cannot be acquired from the ground by using radars and the like. However, it is needless to say that the present invention is also useful when a clearing target is large space debris exceeding 10 cm.

Meanwhile, the method for clearing space debris of the present invention is particularly effective when the method is embodied by locating the spatial region such as the cylindrical body 1 or the spatial region 11 in the geocentric orbit at altitude below 2000 km, where action of the atmospheric drag (air drag) on the space debris can be expected, in such a manner that the spatial region has a greater resistive force than that of the atmosphere in the geocentric orbit. Nevertheless, it is certainly possible to embody the method for clearing space debris of the present invention by locating the spatial region in the geocentric orbit at altitude equal to or above 2000 km in such a manner that the spatial region has a greater resistive force than that of the atmosphere in the geocentric orbit.

As described above, an aspect of the present invention provides a method for clearing space debris in the geocentric orbit, in which: a spatial region is provided in the geocentric orbit in such a manner that the spatial region has a greater resistive force than that of atmosphere in the geocentric orbit; space debris passing through the spatial region is decelerated by using the resistive force of the spatial region; and the decelerated space debris is dropped from the geocentric orbit.

According to the method for clearing space debris, the space debris in the geocentric orbit is subjected to the resistive force from the spatial region and is decelerated when the space debris passes through the spatial region being provided in the geocentric orbit and having the greater resistive force than that of the atmosphere in the geocentric orbit. Due to this deceleration, the perigee altitude of the geocentric orbit where the space debris is flying gradually approaches the Earth and the space debris eventually falls to the altitude (90 km above the ground, for example) suitable for burning the space debris out by atmospheric re-entry.

As described above, the space debris is decelerated by the resistive force at the time of passage through the spatial region so as to fall to the suitable altitude for burn-out by the atmospheric re-entry. Accordingly, it is possible to clear the space debris from the geocentric orbit without causing crush of the space debris which may lead to an increase in the orbiting velocity and a failure to drop the space debris as a consequence thereof.

Meanwhile, in this method for clearing space debris, the spatial region may be formed as a spatial region having higher density than that of the atmosphere in the geocentric orbit and configured to decelerate the space debris passing through the spatial region by a frictional force.

In this way, as long as a material having higher density than that of the atmosphere in the geocentric orbit is provided in the geocentric orbit where the space debris is orbiting, the space debris can be decelerated by the frictional force at the time of passage through the spatial region so as to fall to the suitable altitude for burn-out by the atmospheric re-entry.

Moreover, in this method for clearing space debris, the spatial region may be formed by a peripheral surface of a tubular body configured to direct one of open ends to the Earth so as to cause the space debris to pass through the tubular body in a direction intersecting a straight line that connects both of the open ends of the tubular body to each other.

When the space debris passes through the tubular body in the direction intersecting the straight line connecting both of the open ends of the tubular body to each other, the space debris passes two opposed positions on the peripheral surface of the tubular body. That is, the space debris passes through the spatial region twice every time the space debris passes through the tubular body once. Thus it is possible to decelerate the space debris and to drop the space debris from the geocentric orbit efficiently by means of the frictional force of the spatial region.

Meanwhile, in this method for clearing space debris, the tubular body having an area-to-mass ratio that causes the tubular body to fall from the geocentric orbit while spending a predetermined period may be located in the geocentric orbit.

In this way, the tubular body located in the geocentric orbit spends the predetermined period (25 years, for example) while gradually bringing the perigee altitude closer to the Earth and then falls from the geocentric orbit. Accordingly, the altitude of the orbit where the tubular body orbits gradually decreases over the predetermined period so that the tubular body can decelerate the space debris and drop the space debris from the geocentric orbit in a range of the altitude where the tubular body orbits over that period.

In addition, the tubular body falls from the geocentric orbit where the tubular body is initially located after the predetermined period. Thus it is possible to clear the tubular body so as not to cause the tubular body per se to remain as the space debris in the geocentric orbit.

This application claims the benefit of priority based on Japanese Patent Application No. 2009-276530 filed on Dec. 4, 2009, the entire contents of which are incorporated herein by reference.

INDUSTRIAL APPLICABILITY

According to a method for clearing space debris of the present invention, when space debris in the geocentric orbit passes through a spatial region having a resistive force greater than that of atmosphere in the geocentric orbit, the space debris receives the resistive force from the spatial region. In this way, perigee altitude of the geocentric orbit for the space debris decreases (or decline in the perigee altitude is promoted) and the space debris eventually falls to suitable altitude for burning out by atmospheric re-entry. Thus the space debris can be cleared from the geocentric orbit without causing crush of the space debris which may lead to an increase in an orbiting velocity and a failure to drop the space debris as a consequence thereof.

REFERENCE SIGNS LIST 1 cylindrical body (tubular body)
1a frame
1b deceleration material (spatial region)
11 spatial region
E Earth

The invention claimed is:
1. A method for clearing space debris in a geocentric orbit, comprising:
   providing a spatial region orbiting in the geocentric orbit, the spatial region having a greater resistive force than a resistive force of the atmosphere in the geocentric orbit;
   decelerating space debris passing through the spatial region by the resistive force of the spatial region, maintaining a flight direction of the space debris entering the spatial region and a flight direction of the space debris leaving the spatial region the same; and
   dropping the decelerated space debris from the geocentric orbit,
   wherein the spatial region is formed as a spatial region having higher density than density of the atmosphere in the geocentric orbit and decelerating the space debris passing through the spatial region by a frictional force.
2. The method for clearing space debris according to claim 1, wherein
   the spatial region is formed by a peripheral surface of a tubular body with one of open ends of the tubular body directed to the Earth, and
   the space debris is caused to pass through the tubular body in a direction intersecting a straight line connecting both of the open ends of the tubular body to each other.
3. The method for clearing space debris according to claim 2, wherein the tubular body having an area-to-mass ratio that causes the tubular body to fall from the geocentric orbit while spending a predetermined period is located in the geocentric orbit.

* * * * *